UNITED STATES PATENT OFFICE

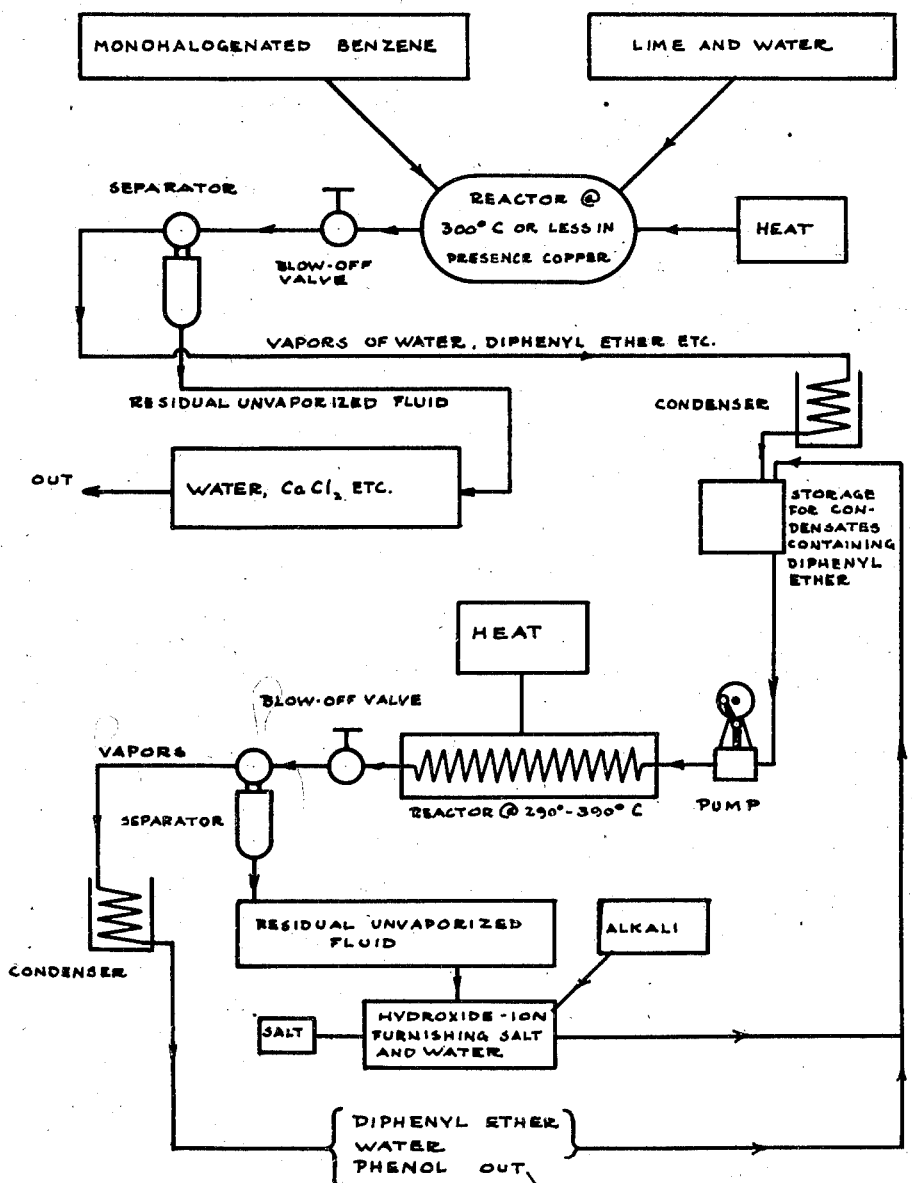

WILLIAM J. HALE AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING PHENOLS

Application filed September 23, 1927. Serial No. 221,468.

The present improvements relate more particularly to the production of a free phenol directly from its anhydride by the hydrolysis thereof by water in the presence of hydroxide-ions from a salt of a strong base and a weak acid, and has as an object the elimination of the use of alkalis and the acids necessary to neutralize same, as also the introduction of simplified steps for the separation of the volatile products of reaction.

In one specific aspect, the present improved process includes the preliminary step of making diphenyl oxide (or equivalent phenolic anhydride) from the corresponding halogenated aromatic hydrocarbon, this step being directly coupled with the hydration of the resulting anhydride to yield the desired hydroxy benzene derivative.

To the accomplishment of the foregoing and related ends, the invention then consists of the steps hereinafter fully described and particularly set forth in the claims, the annexed drawing and the following description illustrating but several of the various ways in which the principle of the invention may be used.

In said annexed drawing:—

The single figure there appearing is a diagrammatic representation on the order of a flow sheet illustrating one preferred method of carrying out the invention.

The preparation of phenol by hydrolysis of benzene halides has been made the subject of a number of researches, all of which make distinct mention of the occurrence of diphenyl oxide as by-product. U. S. Patent 1,607,618 (1926) to W. J. Hale and E. C. Britton furthermore discloses the use of an additional quantity of diphenyl oxide as a means of maintaining the proper balance in the system as set up by benzene halides and caustic soda solution and thus eliminates the further increase of the undesirable diphenyl oxide.

The critical factor in this consideration is the state of equilibrium between diphenyl oxide and water on the one hand and phenol on the other:—

$(C_6H_5)_2O + H_2O \rightleftarrows 2C_6H_5OH$

The rate of reaction of water upon diphenyl oxide becomes pronounced at 320°–325° C. in the presence of hydroxide-ion, and equilibrium conditions are rapidly attained between 330°–360°. The dehydration of phenol into its anhydride is favored by a very low concentration of hydroxide-ion.

The production of phenol $C_6H_5.OH$ from its anhydride, i. e. diphenyl oxide, in aqueous media was first discussed by Meyer and Bergius (Ber. 47, 3158, 1914), who reported that when this anhydride was heated with an aqueous solution of three moles of caustic soda at a temperature of 300° C. and at a correspondingly high pressure, the concentration of hydroxide-ion proved sufficient to effect the hydration after a considerable length of time and securing of end product as sodium phenate.

It has now been discovered that when dealing with aqueous solutions of salts capable through hydrolysis of furnishing the requisite concentration of hydroxide-ion that will promote the forward drive of this equilibrium reaction to the phenol side, we may prevent the combination of phenoxide-ion thus resulting with whatever cation is present by choosing for our hydroxide-ion-producing compound some salt of a strong base and weak acid. This type of compound would in the main afford a sufficiently high concentration of hydroxide-ion and would continue so to function until the concentration of its hydroxide-ion was brought into balance against the increasing proportion of hydrogen-ion as furnished by the free phenol coming into existence, at which stage the concentration of hydroxide-ion would be reduced below that point necessary for its catalytic effect upon the diphenyl oxide plus the water member of the equilibrium system above mentioned. Furthermore, this particular type of compound, must possess an acid radical or anion incapable of replacement, under the conditions of operation, by the phenoxyl group of phenol.

As a consequence of these two determining factors required of the particular compound to be used as hydroxide-ion-furnishing agent, the phenol produced by hydration of its anhydride must remain as free phenol, in equilibrium, of course, with a small proportion of same as held in the aqueous media, and appear in a separate and distinct layer when the reaction mass is withdrawn and cooled. As examples of such salts of strong bases and weak acids, we may mention normal sodium carbonate, sodium tetra-borate, sodium phenate, tri-sodium phosphate, di-sodium phosphate and others. Mono-sodium phosphate and sodium hydrogen carbonate do not so function.

It has also been discovered that this same type of compound, above mentioned as capable of effecting in aqueous media the hydration of the anhydride of phenol, will likewise function through hydrolytic action upon the mono-derivatives of benzene with production of phenol and neutralization of liberated acids and yet of itself will not be more than partially neutralized, such that at all events it cannot exchange its acid radical for the phenoxyl radical of phenol, hereby produced, it being understood that such salts, in the process of effecting these hydrolyses, will not proceed beyond that point of neutrality wherein a condition of equilibrium is set up between the salt solution on the one hand and free phenol on the other.

It has further been discovered that whereas we have been able to bring about the hydration of diphenyl oxide at relatively high temperatures and pressures in aqueous media and by use of only small proportions of hydroxide-ion-furnishing compounds in much less than equi-molecular proportions, it is always advisable to employ such salts in somewhat more than equi-molecular proportions to the diphenyl oxide and thus make possible the employment of a crude anhydride or diphenyl oxide as is usually obtained in the hydrolysis of benzene halides or other mono-derivatives of benzene by caustic alkali or alkaline earth hydroxide solutions. Thus, in the present process, the presence of chlorobenzene with diphenyl oxide will immediately be taken care of by the type of salt just described, and only free phenol can result from such action, which may be represented by the following equation:—

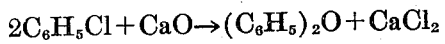
$$C_6H_5Cl + Na_2CO_3 + H_2O \rightarrow C_6H_5OH + NaHCO_3 + NaCl$$

As a result the main trend of reaction, the hydration of diphenyl oxide into free phenol, cannot be other than augmented by the presence of such impurities capable of hydrolysis under the conditions set forth. In fact, it is economically desirable that the diphenyl oxide carry an appreciable quantity of mono-halogen derivatives of benzene as an impurity, not primarily for furnishing a cheaper supply of raw material and yielding more than the theoretical quantity of phenol possible from the diphenyl oxide actually present in such raw material, but actually to serve for a check on the activity of catalytic salt solutions. Theoretically, the re-use of this aqueous hydroxide-ion-furnishing liquor can be continued indefinitely but practically it is well that it be occasionally purified; the presence of impurities in the diphenyl oxide, such for example as chlorobenzene, naturally will require the elimination of ordinary sodium chloride at not frequent intervals and thus the character and quality of the catalytic liquors may be kept always at maximum.

Furthermore, it has been found that the more or less complex hydroxy derivatives usually occurring in the phenol as obtained by acidification of phenate liquors resulting from the action of caustic alkali upon benzene halides and the like, may now be entirely eliminated if operations are conducted with a very weak base in less amount than theoretically required for production of phenate and alkali salt. Diphenyl oxide is thus made the end product as diagrammatically here represented:

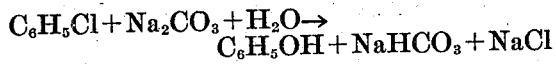
$$2C_6H_5Cl + CaO \rightarrow (C_6H_5)_2O + CaCl_2$$

The lower temperature, i. e. at 250°–300° at which this reaction may be made to proceed eliminates much of the above-mentioned derivatives appearing at high temperatures, and whatever such complex derivatives are occurrent will not now enter into the crude diphenyl oxide according to the process of this invention, as such oxide will have been removed either directly by mechanical means or by distillation with steam, without disturbing whatever hydroxy compounds were held back in the slightly alkaline liquors in the form of alkali salts.

It is proposed, therefore, to employ in the present process just that form of diphenyl oxide (or similar anhydrides of corresponding benzene hydrocarbons) as is obtainable by hydrolysis of the mono-halogen derivatives of such benzene hydrocarbons by very weak alkaline solutions and at lowest practical temperatures, (considerably under 300° C. when proper catalyst is employed), and to withdraw such resulting diphenyl oxide by mechanical means directly from the reaction mixture in which it is produced. Thus, by use of lime in aqueous mixtures, chlorobenzene can be hydrolyzed almost completely into diphenyl oxide. This diphenyl oxide together with traces of volatile impurities, is steam distilled for use in an autoclave or continuous tubular system operating preferably at a temperature of 325° to 375° C. and carrying a liquor, such as sodium carbonate solution which of itself is practically unaffected in the hydration of the diphenyl oxide and thus free phenol is produced without the consumption of either alkali or the necessary quantity of acid required for neutralization of such alkali. Upon withdrawal of the reaction products from said system, the free phenol, together with unacted-upon diphenyl oxide, is removed by steam distillation or by other or mechanical means and separated into a phenol fraction and diphenyl oxide fraction. The latter fraction is returned to the system together with additional incoming diphenyl oxide and the residual aqueous catalytic liquor.

As previously noted the single figure of the drawing illustrates in diagrammatic form a preferred method of carrying out the improved process. The drawing bears legends which make it largely self-explanatory from which it will be seen that mono-halogenated benzene, lime and water are reacted together in a suitable container in the presence of copper at a temperature under 300° C. and under pressure in excess of the vapor pressure of the mixture. Upon completion of the reaction the contents are preferably vented hot in order to utilize the stored heat for self-evaporation (such method in itself, however, forming no part of the present invention); that is, the contents are relieved through a controlled blow-off valve which reduces the pressure to atmospheric or thereabouts, causing the evaporation of a large fraction of the volatiles including water, unreacted halogenated benzene and the diphenyl oxide which is the main product of the foregoing reaction. Following the blow-off valve is a separator of suitable type which may be such as is used for separating water from steam or liquids from gases through which the blown mixture of vapors and unvaporized residual fluids passes, and in which the vapors are separated from said residual liquid. The so separated vapors are condensed and collected in a storage tank for use in the next reaction step, these condensates containing the diphenyl oxide made in the preceding reaction step.

The unvaporized residual liquid, chiefly water, calcium chloride and organic products of the reaction other than diphenyl ether are vented from the system to waste or for desired uses.

The collected condensates are then preferably pumped through a continuous tubular autoclave reactor, together with the solution of the hydroxide-ion-furnishing salt and in that reactor are brought up to a temperature of 290°–390° C. under pressure in excess of the vapor pressure at that temperature. The reacted mixture is then blown through a suitable blow-off valve continuously, said valve being controlled in any feasible manner to maintain the desired pressure upon the reactor, and the flash evaporation realized is similar to that already mentioned for the preceding reacted mixture. A separator is here again used and the residual unvaporized fluid containing the hydroxide-ion-furnishing salt in water which has remained largely unchanged is returned to the reactor along with the diphenyl ether from the previous step. The vapors containing the free phenol formed in the reaction which may easily reach a yield corresponding to a conversion of two-thirds of the anhydride supplied to the reaction, the water vaporized at the blow-off along with the diphenyl oxide unchanged also, and vaporized, are condensed and the diphenyl oxide and water are returned to the reaction step the phenol being removed from the system. Due to the presence in the condensate containing the diphenyl oxide from the first reaction step of some unreacted mono-halogenated benzene some salt will accumulate in the reaction mixture of the second system and must be eliminated occasionally as by concentrating the unvaporized residual fluid from the reactor and a corresponding amount of alkali must be added to make up that removed with the salt. This may be obviated by refining the diphenyl oxide to remove the halogenated benzene if so desired, but the method outlined permits the use of the crude product from the first step for the production of free pehnol in the second step.

Other means of working, either in batch or continuously, may be used without departing from the spirit of our invention and choice may be made as to the precise halogen used for the benzene derivative or the hydroxide-ion-furnishing salt which as stated may be one of the mineral acid salts mentioned or an organic salt such as sodium phenate. Among the preferred mineral salts is sodium carbonate. If it be preferred to use sodium phenate as the hydroxide-ion-furnishing salt it will be more economical to refine the diphenyl oxide to remove halogenated compounds therefrom so as to restrict the formation of salt in the phenol reaction step and the loss of sodium phenate accompanying the removal of the salt.

With reference to the first step, i. e. that in which diphenyl oxide is produced, the production of diphenyl oxide is dependent upon the presence of hydroxide-ion in low concentration, such as is afforded by weak alkalis, as for instance, calcium hydroxide, barium hydroxide, and soda ash, in aqueous solution, hence only such weak bases may be employed in this step. It is also advisable in this step that there be an excess of the benzene halide, specifically, chlorobenzene, in order to avoid possible production of phenates. It is also advisable to operate at a temperature below 300° C. because above that temperature the tendency of diphenyl oxide to add the elements of water becomes perceptible. To illustrate procedure in this step, if one mole of lime in the form of milk of lime be reacted with two and one-half moles of chloro-benzene at a temperature under 300° for approximately one hour, two moles of the chlorobenzene will be converted almost fully into diphenyl oxide and in flash evaporation of the reaction products will carry the remaining chlorobenzene with it which may be separated therefrom if necessary by distillation.

With reference to the reaction step producing free phenol, it is to be noted that diphenyl oxide may be converted into phenol not alone by a salt of a strong base and a weak acid, such as sodium carbonate, but such conversion will take place if a plurality of such salts be present. To illustrate the procedure in this step, if an 8% solution of sodium carbonate be used, to which is added diphenyl oxide in the ratio of one mole thereof to one and one-half moles of the carbonate, and the reaction be carried on for about one hour at 370°, a conversion of diphenyl oxide into phenol to the amount of 75% will be realized. Equilibrium in this reaction has not been found attainable in much less than one hour of heating. If, furthermore, to this sodium carbonate solution we add a small portion of sodium phenate we shall find that the hydration of the diphenyl oxide will have been made to proceed somewhat further, dependent naturally upon the total concentration of the hydroxide ions.

Whenever phenol and diphenyl oxide are produced by action of alkali upon benzene derivatives, the presence of phenol is always noted and will be present in considerable proportion if the temperature is above 300° C. at which point the equilibrium reaction comes into effect. If we operate with an excess of benzene halide and only with a weak alkali and under 300° the well-known equilibrium reaction is barely approached and practically complete conversion of all the possible alkali phenate under production to diphenyl oxide by the action of excess of halogenated benzene is now possible.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making a free hydroxy benzene derivative directly without acidification of the reaction product, the step which consists in subjecting to heat and pressure an aqueous mixture of the anhydride of such derivative and a salt of a strong base and weak acid.

2. In a method of making a free phenol directly without acidification of the reaction product, the step which consists in subjecting to heat and pressure an aqueous mixture of the anhydride of such phenol and a salt of a strong base and weak acid.

3. In a method of making a free phenol directly without acidification of the reaction product, the step which consists in reacting upon the anhydride of such phenol with a water solution of a salt of a strong base and weak acid at a temperature of from 290° to 390° C. and under a pressure at or above the vapor tension of the reacting ingredients.

4. In a method of making a free phenol directly without acidification of the reaction product, the step which consists in reacting upon the anhydride of such phenol with a water solution of a salt of a strong base and weak acid such as will furnish a concentration of hydroxide-ion as catalyst.

5. In a method of making a free phenol directly without acidification of the reaction product, the step which consists in reacting upon the anhydride of such phenol with a water solution of a salt of a strong base and weak acid such as will furnish a concentration of hydroxide-ion as catalyst in excess of the concentration of hydrogen-ion arising during the progress of the reaction.

6. In a method of making free phenol directly without acidification of the reaction product, the step which consists in reacting at elevated temperature and under a pressure at or above the vapor pressure of the reacting ingredients upon diphenyl oxide with a water solution of a salt of a strong base and weak acid such as will furnish a concentration of hydroxide-ion as catalyst.

7. In a method of making free phenol directly without acidification of the reaction product, the step which consists in reacting upon diphenyl oxide with a water solution of sodium carbonate.

8. In a method of making free phenol directly without acidification of the reaction product, the step which consists in reacting upon diphenyl oxide with a water solution of sodium carbonate in amount sufficient to furnish a concentration of hydroxide-ion as catalyst in excess of the concentration of hydrogen-ion arising in the course of the reaction.

9. In a method of making free phenol directly without acidification of the reaction product, the step which consists in reacting upon diphenyl oxide with a water solution of sodium carbonate at a temperature of from 290° to 390° C. and under a pressure at or above the vapor tension of the reacting ingredients.

10. In a method of making free phenol directly without acidification of the reaction product, the step which consists in reacting upon diphenyl oxide with a water solution of sodium carbonate at a temperature of from 290° to 390° C. and under a pressure at or above the vapor tension of the reacting ingredients, the amount of such sodium carbonate being sufficient to furnish a concentration of hydroxide-ion as catalyst in excess of the concentration of hydrogen-ion arising in the course of the reaction.

11. In a method of making free phenol directly without acidification of the reaction product, the steps which consist in reacting upon diphenyl oxide with a water solution of sodium carbonate at a temperature of from 290° to 390° C. and a pressure at or above the vapor tension of the reacting ingredients, separating any unreacted sodium carbonate and diphenyl oxide, and returning same to the first step.

12. In a method of making free phenol without acidification of the reaction product, the steps which consist in subjecting to heat and pressure a mixture of mono-halogenated benzene, lime and water, whereby such halogenated benzene is preferentially hydrolyzed to form diphenyl oxide, separating out the latter from the reaction products, and then heating under pressure such diphenyl oxide admixed with a water solution of a catalytic salt of a strong base and weak acid, which salt does not substitutively combine with phenol.

13. In a method of making free phenol without acidification of the reaction product, the steps which consist in subjecting to heat and pressure a mixture of mono-halogenated benzene, lime and water, whereby such halogenated benzene is preferentially hydrolyzed to form diphenyl oxide, separating out the latter from the reaction products, and then heating under pressure such diphenyl oxide admixed with a water solution of catalytic salt of a strong base and weak acid, which salt does not substitutively combine with phenol, removing the phenol thus formed, and separating and returning any unreacted diphenyl oxide to the third step.

14. In a method of making free phenol without acidification of the reaction product, the steps which consist in subjecting to heat and pressure a mixture of mono-halogenated benzene, lime and water, whereby such halogenated benzene is preferentially hydrolyzed to form diphenyl oxide, separating out the latter from the reaction products, and then heating under pressure such diphenyl oxide admixed with a water solution of sodium carbonate removing the phenol thus formed, and separating and returning any unreacted diphenyl oxide to the third step.

15. A process of the character described, which comprises heating diphenyl oxide under pressure in the presence of a catalytic salt of a strong base and weak acid, which salt does not substitutively combine with phenol.

16. A process of the character described, which comprises heating diphenyl oxide under pressure in the presence of a catalytic salt of a strong base and weak acid, which salt does not substitutively combine with phenol, removing the phenol thus formed, and separating and returning any unreacted diphenyl oxide to the first step.

Signed by us this 21st day of September, 1927.

WILLIAM J. HALE.
EDGAR C. BRITTON.